(12) United States Patent
Marquez et al.

(10) Patent No.: US 10,094,902 B2
(45) Date of Patent: Oct. 9, 2018

(54) DUAL FREQUENCY ANGLE OF ARRIVAL ESTIMATION

(71) Applicant: Apple Inc., Cupertino, CA (US)

(72) Inventors: Alejandro J. Marquez, Cupertino, CA (US); Mohit Narang, San Jose, CA (US); Ruben Caballero, San Jose, CA (US); Indranil S. Sen, Fremont, CA (US); Shang-Te Yang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 279 days.

(21) Appl. No.: 15/050,153

(22) Filed: Feb. 22, 2016

(65) Prior Publication Data
US 2017/0242092 A1    Aug. 24, 2017

(51) Int. Cl.
*G01S 3/46* (2006.01)
(52) U.S. Cl.
CPC ..................... *G01S 3/46* (2013.01)
(58) Field of Classification Search
CPC ..... G01S 5/04; G01S 3/46; G01S 3/48; G01S 3/043
USPC .......................................................... 342/442
See application file for complete search history.

(56) References Cited

U.S. PATENT DOCUMENTS

| 5,724,047 | A  | 3/1998  | Lioio et al. |
| 6,459,903 | B1 | 10/2002 | Lee |
| 6,700,536 | B1* | 3/2004  | Wiegand ................. G01S 3/023 342/417 |
| 2008/0316105 | A1 | 12/2008 | Seong et al. |
| 2012/0256783 | A1* | 10/2012 | Sego ..................... G01S 13/106 342/146 |
| 2014/0225804 | A1 | 8/2014  | Wild et al. |
| 2014/0269389 | A1* | 9/2014  | Bukkfejes ............. H04W 24/08 370/252 |
| 2015/0030060 | A1* | 1/2015  | Kyosti ............... H04B 17/0087 375/224 |
| 2015/0268326 | A1* | 9/2015  | Sung ........................ G01S 5/02 455/456.3 |

FOREIGN PATENT DOCUMENTS

| WO | 20070838899 A1 | 7/2007 |
| WO | 20110160698 A1 | 12/2011 |
| WO | 20130121369 A1 | 8/2013 |

OTHER PUBLICATIONS

Partial International Search for PCT Application No. PCT/US2017/018284 dated May 10, 2017, 10 pgs.

* cited by examiner

*Primary Examiner* — Harry K Liu
(74) *Attorney, Agent, or Firm* — Fletcher Yoder, PC

(57) ABSTRACT

Systems, methods, and devices are provided to estimate angle of arrival of wireless signals. An electronic device may include two or more antennas that receive a wireless transmission. The wireless transmission includes a first frequency signal at a first frequency and a second frequency signal at a second frequency. The electronic device includes angle of arrival logic that may determine one or more angles of arrival of the wireless transmission to the electronic device using phase difference on arrival based on each of the first and second frequency signals.

17 Claims, 12 Drawing Sheets

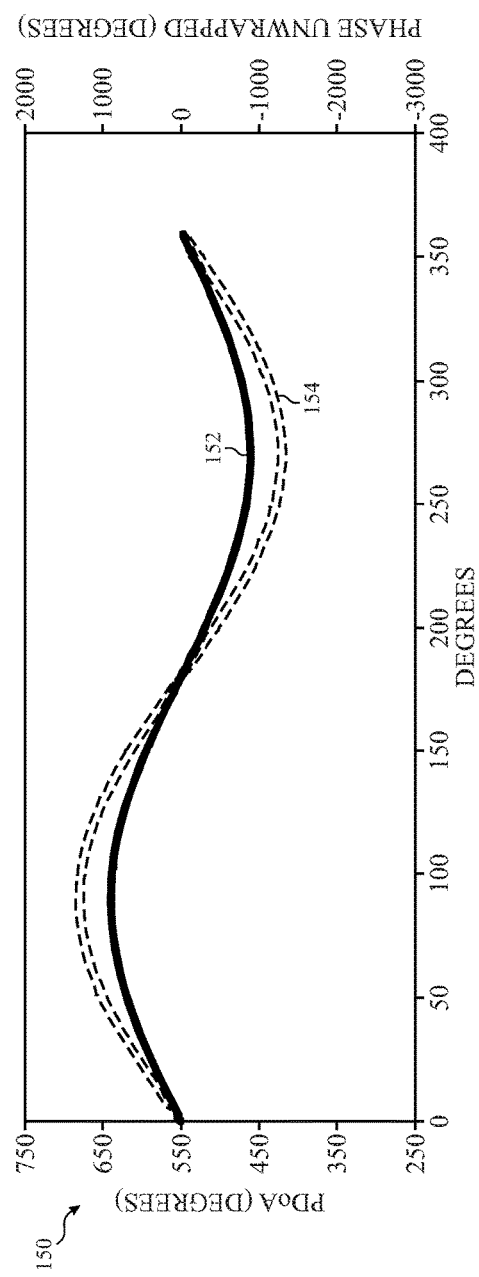
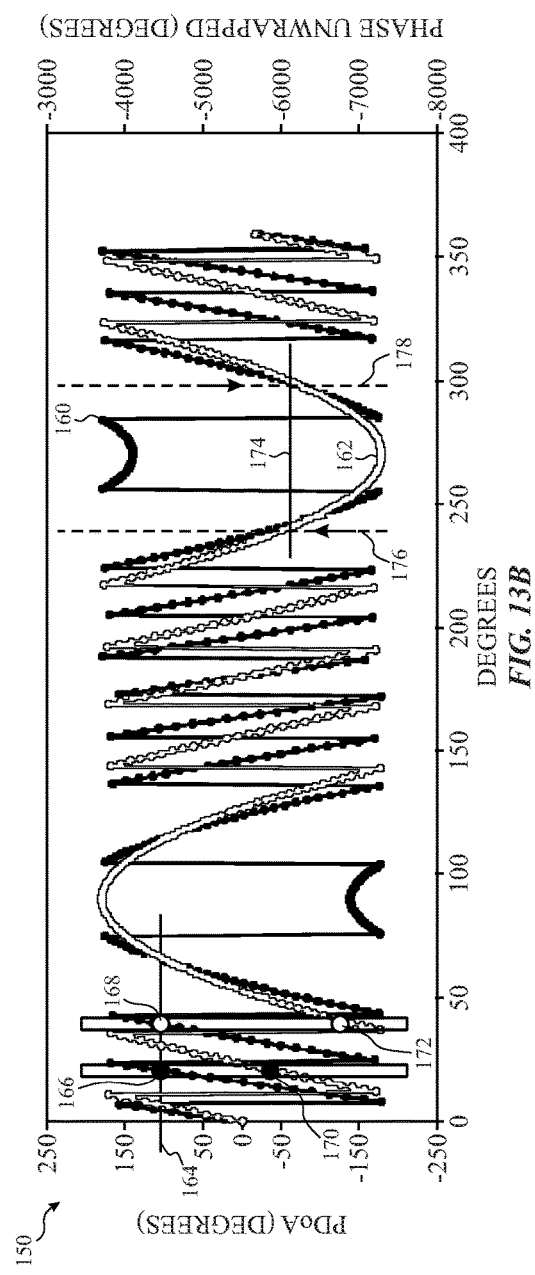

DUAL FREQUENCY ANGLE OF ARRIVAL ESTIMATION

BACKGROUND

The present disclosure relates generally to techniques for estimating an angle of arrival of a wireless signal at an electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Angle of arrival (AoA) measurement is a method for determining the direction of propagation of a radio-frequency wave received by two or more antennas. Among other things, AoA determines the direction by measuring the time difference of arrival (TDOA) at individual antennas. The time differences may be used to calculate AoA.

Generally, this TDOA measurement is made by measuring the difference in received phase or some other point of interest at each antenna. Consider, for example, a two-element array spaced apart by one-half the wavelength of an incoming RF wave. If a wave is incident upon the antennas simultaneously, the time difference is zero and the AoA is 0°. If a wave is incident upon the array at a 180° phase difference, the wave passes through or around one antenna when passing toward the other antenna. The AoA would be 90°. AoA may be used in locating or locating a direction to/from an electronic device (e.g., cellular phone).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with the present techniques, the disclosure introduces an approach to accurately estimate an angle of arrival for a transmission using dual frequencies enabling accurate determinations even when a spacing between two antennas is different (e.g., longer than) a length of a half wavelength of the transmission that introduces ambiguity into angle determinations. In some devices, one or more antennas may receive multiple frequencies with a fixed distance between the antennas such that the spacing may be suitable for some frequencies but not for others. Thus, difference on arrival (DoA) techniques, such as phase difference on arrival (PDOA) or time difference on arrival (TDOA) may present multiple solutions for an AoA estimation. Performing PDOA at two frequencies resolves many of these ambiguities. However, some ambiguities may still exist from the PDOA analysis. In such cases, TDOA may be used to resolve the remaining ambiguities by eliminating some of the incorrect dual-frequency PDOA results even though the TDOA estimations may have a resolution too low to accurately estimate the AoA alone without the PDOA.

BRIEF DESCRIPTION OF THE DRAWINGS

Various aspects of this disclosure may be better understood upon reading the following detailed description and upon reference to the drawings in which:

FIG. 13A illustrates a graph of unwrapped phase of two frequencies versus degrees, according to an embodiment;

FIG. 13B illustrates a graph of PDOA versus degrees of the two frequencies of FIG. 13A, according to an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In accordance with the present techniques, the disclosure introduces an approach to accurately estimate an angle of arrival for a transmission using dual frequencies when a spacing between antennas is different (e.g., longer than) a length of a half wavelength of the transmission. In some devices, the antenna may receive multiple frequencies with a fixed distance between the antennas. Thus, difference on arrival (DoA) techniques, such as phase difference on arrival (PDOA) may present multiple solutions for the AoA problem. Performing PDOA at two frequencies resolves many of these ambiguities. However, some ambiguities may still exist. In such cases, TDOA may be used to resolve the remaining ambiguities even though the TDOA estimations have a resolution too low to accurately estimate the AoA alone.

Figure 1:
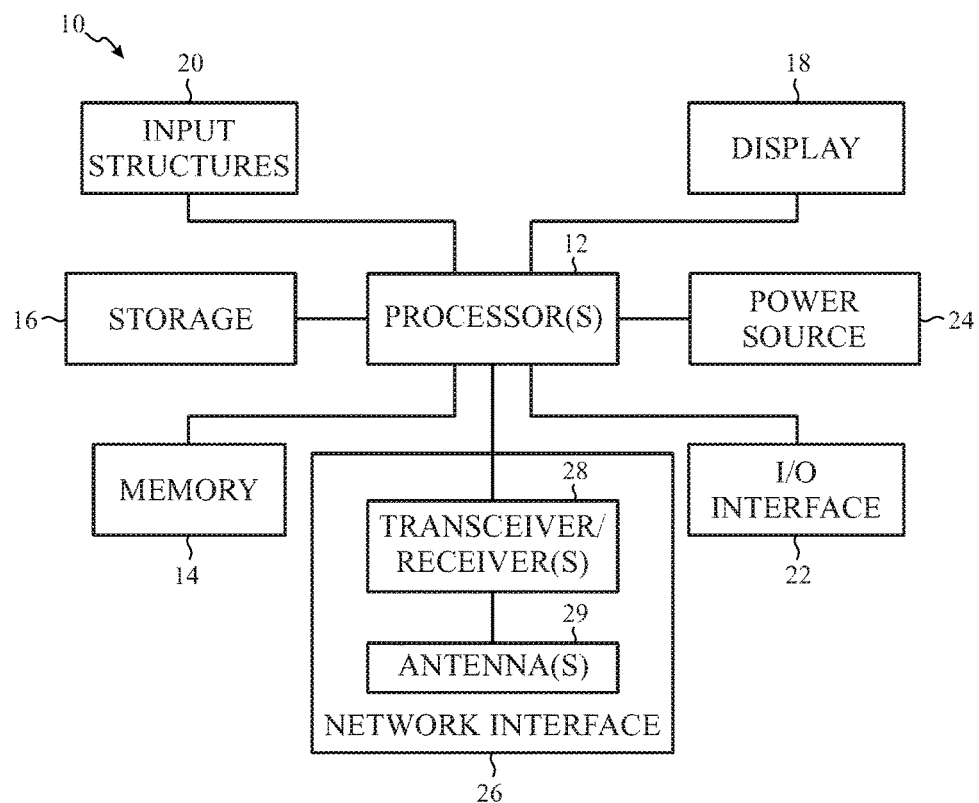
FIG. 1 is a schematic block diagram of an electronic device including wireless transceiver(s)/receiver(s), in accordance with an embodiment.

With these features in mind, a general description of suitable electronic devices that may include noise cancellation circuitry. Turning first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and network interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

The network interface(s) 26 enable the electronic device 10 to connect to one or more network types. For example, the network interface(s) 26 may be configured to connect to 802.11 networks, 802.15.4 networks, cellular (e.g., long-term evolution LTE) networks, and/or other wireless network types that may be suitable for use by the electronic device 10. The network interface(s) 26 include transceiver/receiver(s) 28 and antenna(s) 29. The transceiver/receiver(s) 28 may include one or more receivers and/or transmitters that are configured to send and/or receive information via one or more respective antennas of the antenna(s) 29. Each transceiver/receiver 28 may be connected to its own antenna 29. Alternatively, at least some of the transceiver/receiver(s) 28 may share an antenna 29.

Figure 2:
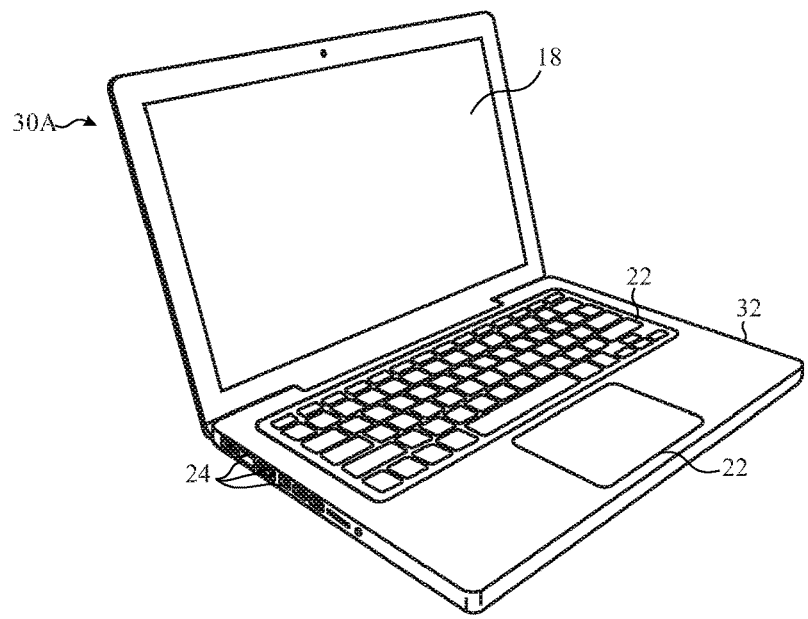
FIG. 2 is a perspective view of a notebook computer representing an embodiment of the electronic device of FIG. 1, in accordance with an embodiment.
Figure 3:
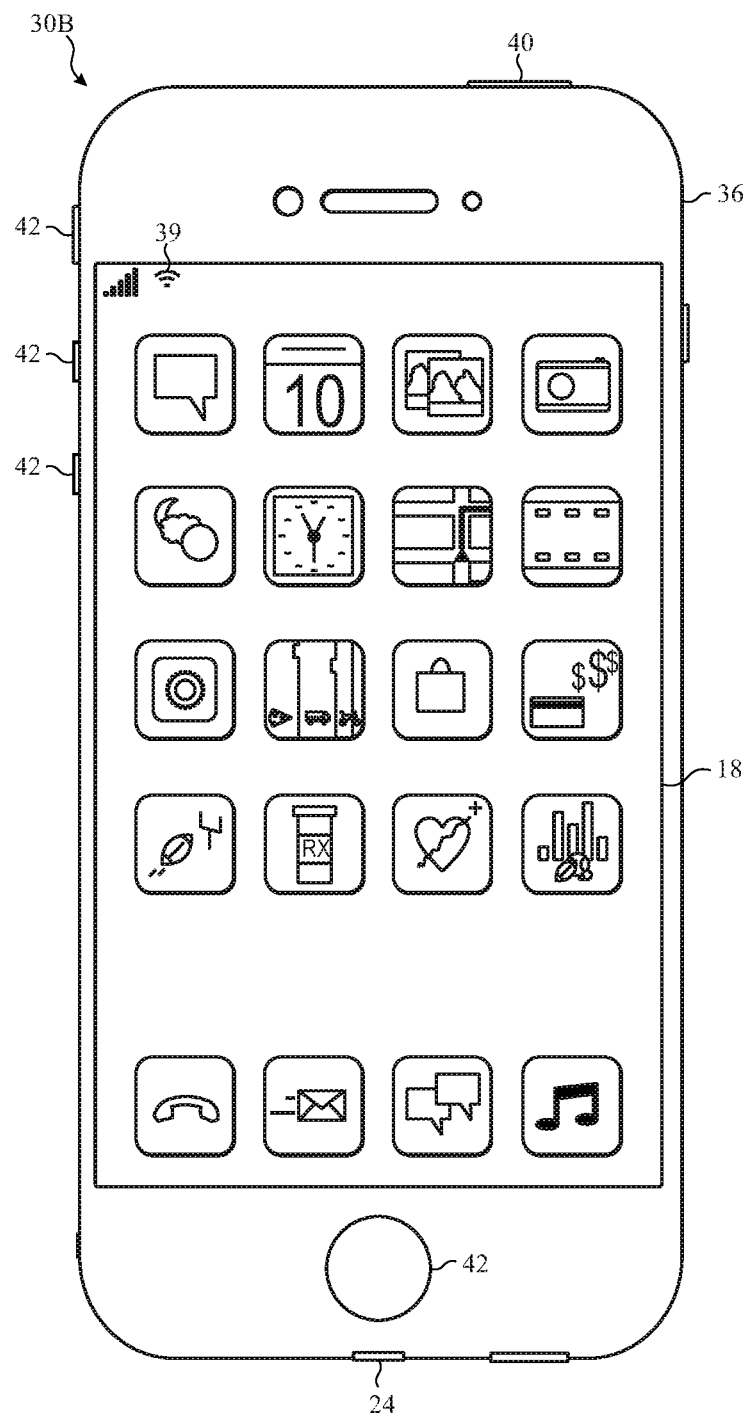
FIG. 3 is a front view of a hand-held device representing another embodiment of the electronic device of FIG. 1, in accordance with an embodiment.
Figure 4:
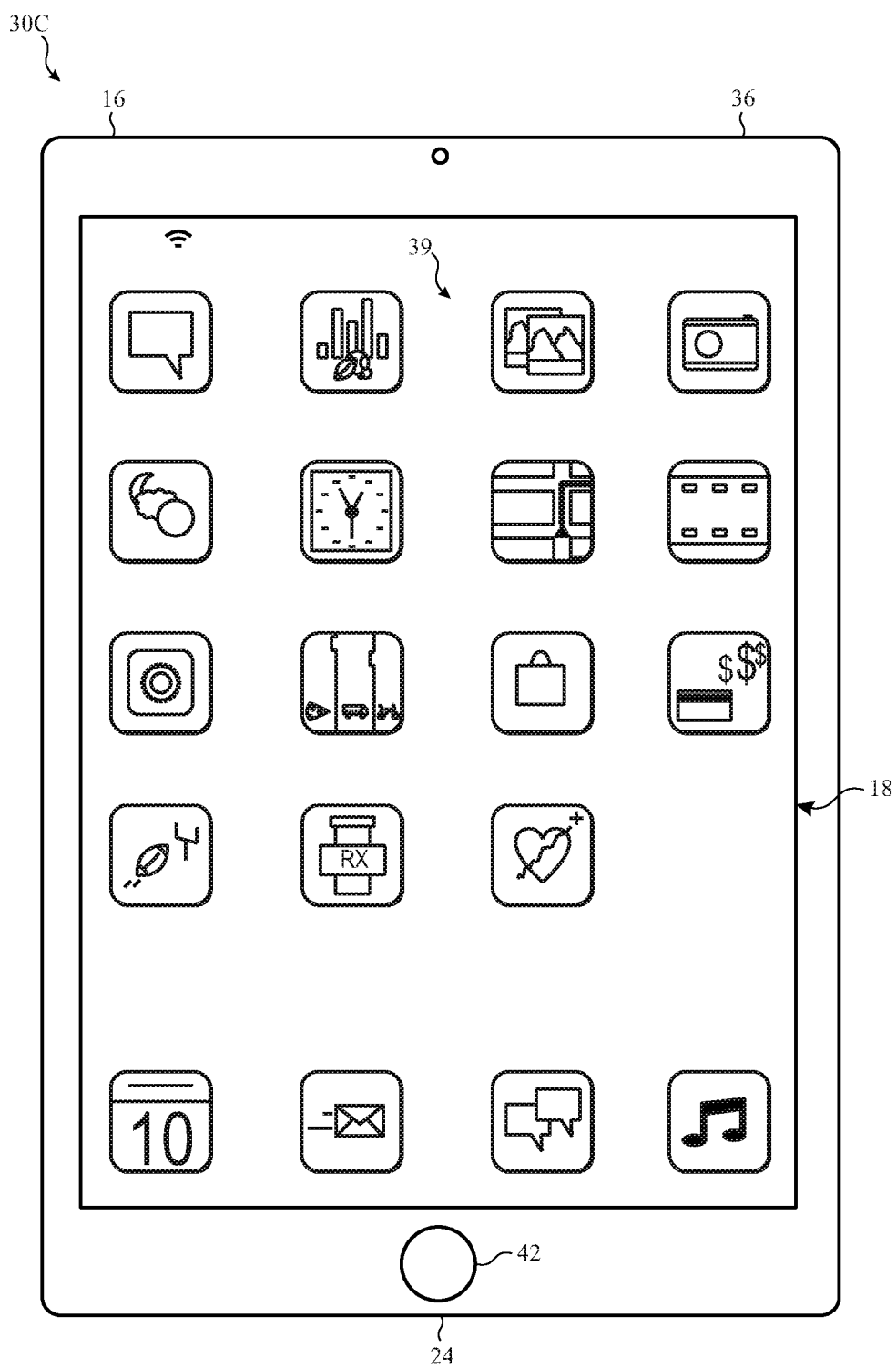
FIG. 4 is a front view of another hand-held device representing another embodiment of the electronic device of FIG. 1, in accordance with an embodiment.
Figure 5:
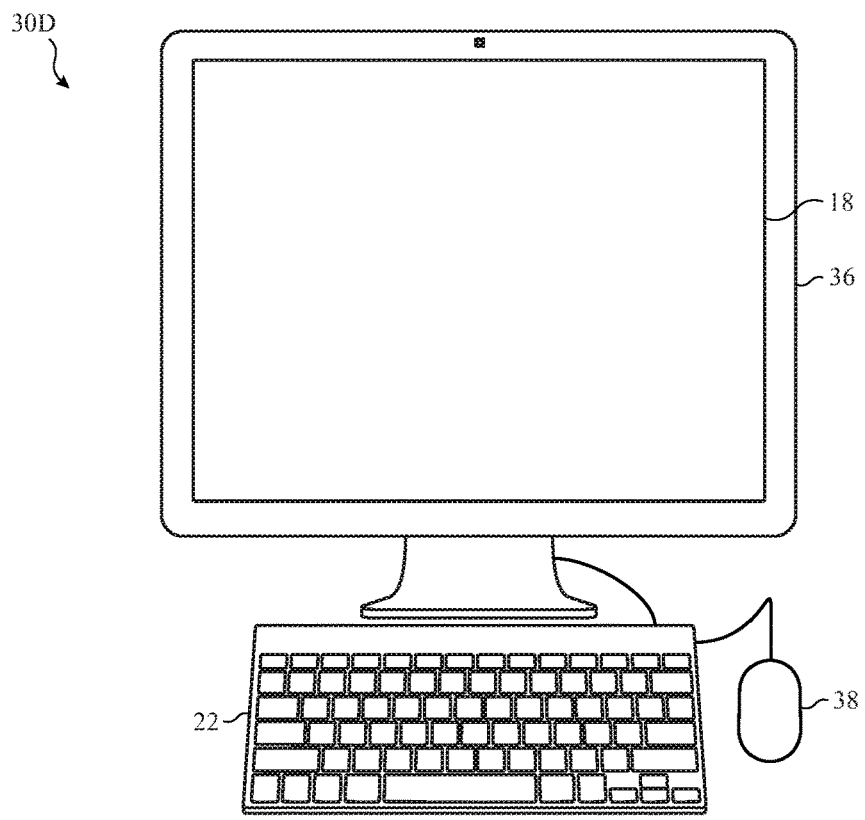
FIG. 5 is a front view of a desktop computer representing another embodiment of the electronic device of FIG. 1, in accordance with an embodiment.
Figure 6:
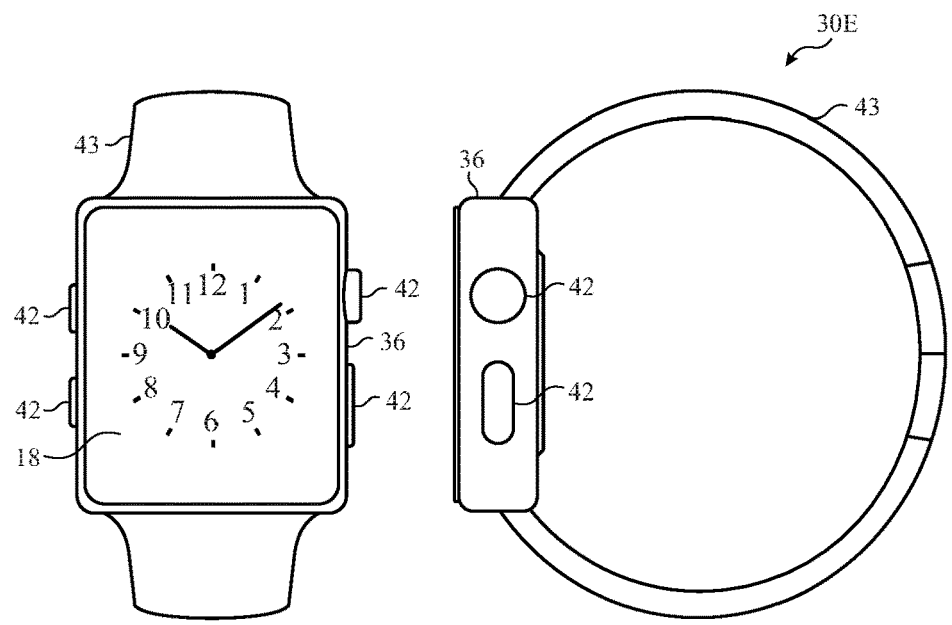
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., e.g., pressing a button to increase or decrease a volume level). The I/O interface 22 may enable electronic device 10 to interface with various other electronic devices. The I/O interface 22 may include various types of ports that may be connected to cabling. These ports may include standardized and/or proprietary ports, such as USB, RS232, Apple's Lightning® connector, as well as one or more ports for a conducted RF link. The I/O interface 22 may also include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a 3rd generation (e.g., 3G) cellular network, 4th generation (e.g., 4G) cellular network, or long term evolution (e.g., LTE) cellular network. The I/O interface 22 may also include interfaces for, for example, broadband fixed wireless access networks (e.g., WiMAX), mobile broadband Wireless networks (e.g., mobile WiMAX), and so forth.

As further illustrated, the electronic device 10 may include a power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 20, and ports of the I/O interface 22. In one embodiment, the input structures 20 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 22 may open through the enclosure 36 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the display 18. In certain embodiments, a user of the computer 30D may interact with the computer 30D using various peripheral input devices, such as the keyboard or mouse 38, which may connect to the computer 30D via a wired and/or wireless I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. The display 18 of the wearable electronic device 30E may include a touch screen (e.g., e.g., LCD, organic light emitting diode display, active-matrix organic light emitting diode (e.g., AMOLED) display, and so forth), which may allow users to interact with a user interface of the wearable electronic device 30E.

Figure 7:
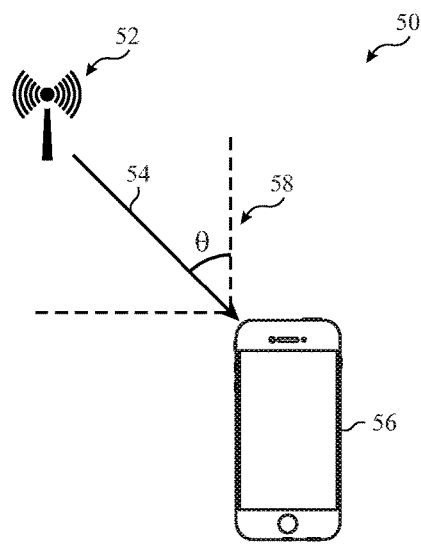
FIG. 7 is a schematic view of an electronic device receiving a transmission from a transmitter, according to an embodiment.

As discussed previously, the electronic device 10 includes transceiver/receiver(s) 28 and antenna(s) 29 for wirelessly communicating with remote devices. As used herein, transceiver 28 may be used while referring to a device that includes a transceiver or a separate transmitter and receiver. For example, FIG. 7 illustrates a transmitter 52 that transmits a signal/wireless transmission 54 to be received by an electronic device 56. The transmitter 52 may be a cellular basestation or any other wireless transmitter that may send the wireless transmission 54 to the electronic device. The wireless transmission 54 is received at an angle of arrival 58 that indicates a direction from which the wireless transmission is received. For example, the angle of arrival 58 may indicate an angle of the transmission off North (or any other reference directions).

Figure 8:
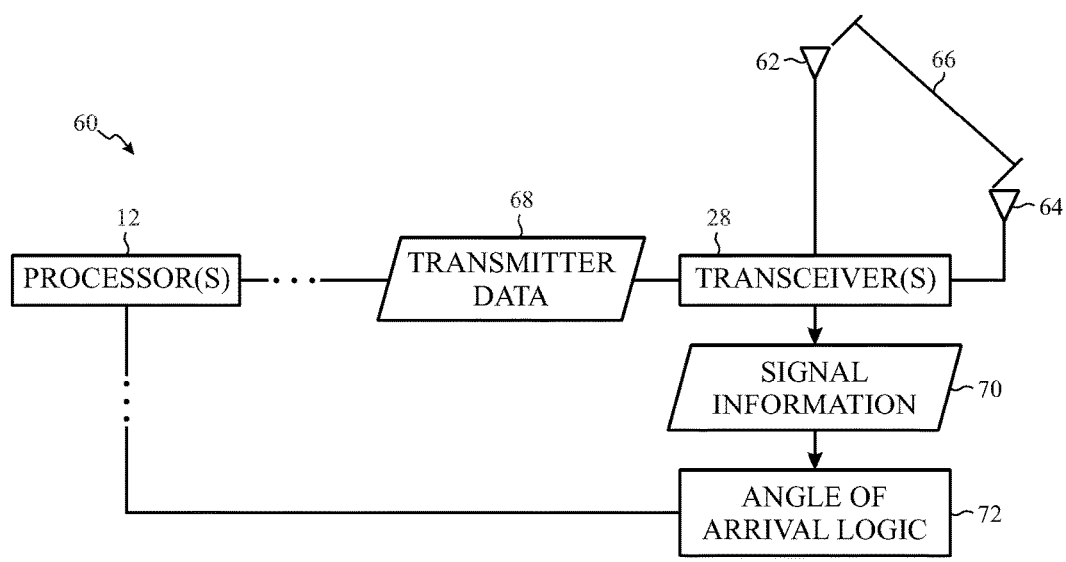
FIG. 8 illustrates a schematic diagram of an angle of arrival (AoA) computation system, according to an embodiment.

FIG. 8 illustrates a receiver system 60 of the electronic device 56 that includes a first antenna 62 and a second antenna 64 spaced an antenna spacing distance 66 apart. The transmission 54 is received at the first antenna 62 and the second antenna 64 and passed to the transceivers 28. From this information, transmitted data 68 that corresponds to the information being transmitted to the electronic device 56. The transceivers 28 also receive signal information 70 about the received transmission 54. For example, the signal information 70 may include phase information and/or timing information of one or more points of interest in the transmission 58. The signal information 70 is passed to angle of arrival (AoA) logic 72 that determines angle of arrival of the transmission 58 based on time difference and/or phase difference between how the transmission 58 is received at the first antenna 62 and the second antenna 64.

As noted above, the angle of arrival 58 may be determined using time difference on arrival (TDOA) or phase difference on arrival (PDOA) when the transmission 54 is received at multiple antennas. For example, the TDOA may include uplink-time difference on arrival (U-TDOA) or estimated observed time difference (EOTD). In some embodiments, to ensure accuracy of estimation, the electronic device 56 has antennas spaced at a distance equal to half a wavelength ($\lambda$) of a received frequency. However, some antennas 62 or 64 may use multiple frequencies and may not be able to be specifically spaced to all frequencies that are received by the antennas 62 and 64 due to a fixed spacing between the antennas 62 and 64. In other words, no single spacing satisfies this half wavelength rule for all frequencies. Instead, the antennas 62 and 64 have a non-half-wavelength spacing for at least some frequencies. Accordingly, the AoA estimations include some ambiguities that make a single determination of angle via TDOA or PDOA to provide more than a single possibility of an angle of arrival. In other words, by having a spacing between antennas 62 and 64 that is different than (less than or more than) half a wavelength, some DoA estimations (e.g., TDOA or PDOA) may be insufficient.

Figure 9:
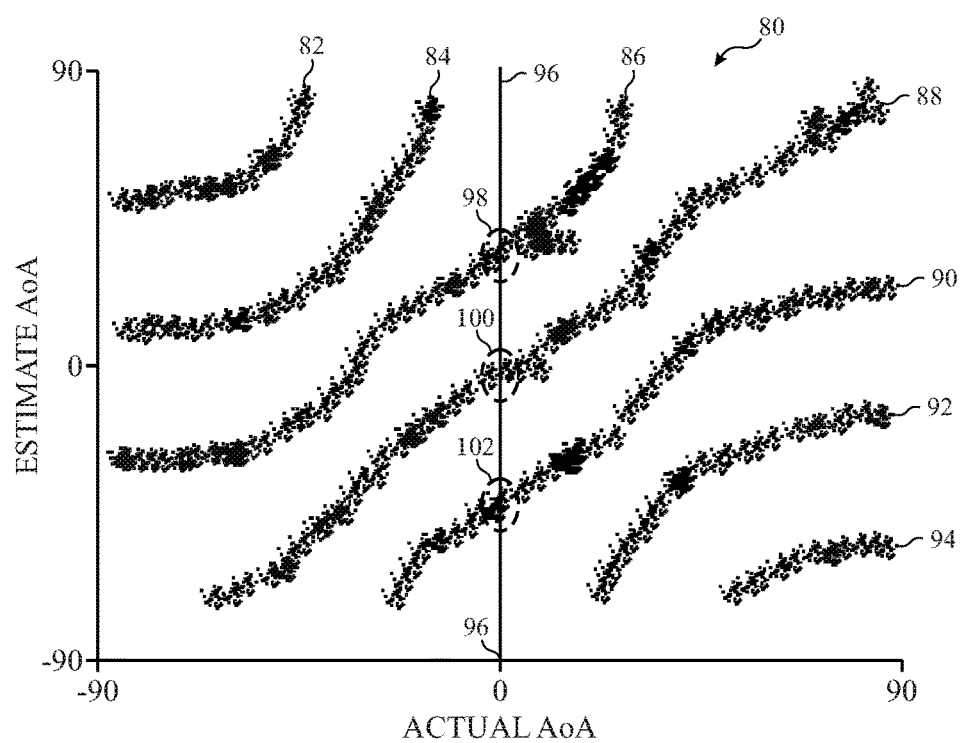
FIG. 9 illustrates a graph of estimated AoA using phase difference on arrival (PDOA) versus actual AoA for an electronic device having a distance different than half a wavelength of a received signal, according to an embodiment.

For example, FIG. 9 illustrates a graph 80 plotting actual angles of arrival versus multiple possible estimated angles of arrival due to a spacing between antennas 62 or 64 that is not half a wavelength of the received signal for which angle arrival is being determined. The graph 80 may correspond to possible estimations for an angle of arrival using phase difference on arrival (PDOA). As illustrated, the graph 80 includes curves 82, 84, 86, 88, 90, 92, and 94 that each correspond to a possible estimated angles of arrival of for an actual angle of arrival of the received signal. For example, at an actual angle of arrival 96, PDOA estimation may result in three possible estimates of the angle of arrival: point 98, point 100, and point 102.

Figure 10:
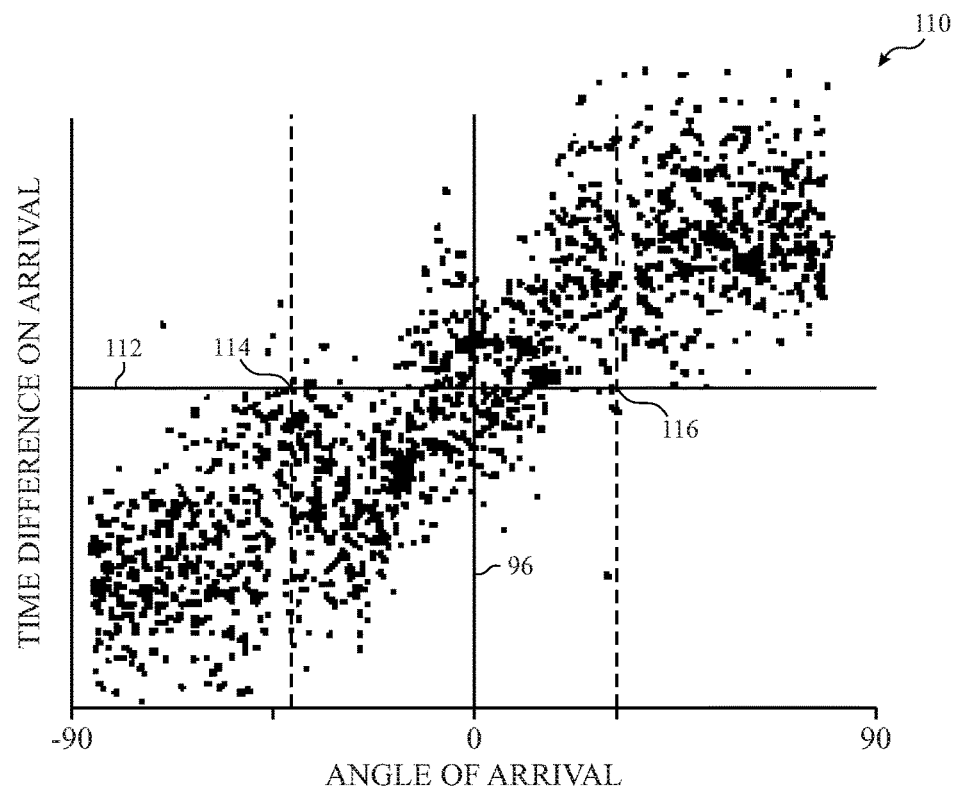
FIG. 10 illustrates a graph of time difference on arrival versus the corresponding angles of arrival, according to an embodiment

Furthermore, TDOA-alone determinations may be insufficient to accurately identify the angle of arrival. The inaccuracy of the AoA may be due to noise and/or group delay of the antennas. For example, a TDOA estimation graph 110, as illustrated in FIG. 10, illustrates possible actual angles of arrival and their corresponding time differences on arrival. As illustrated, the graph 110 indicates that a single time difference 112 may correspond to multiple different angles of arrival between the angle 114 and the angle 116. Furthermore, the actual angle of arrival 96 (or other angles of arrival) corresponds to numerous time differences.

In other words, when the antennas 62 and 64 are spaced single-point DoA (e.g., PDOA and TDOA) estimations may be inadequate alone. Instead, additional measurements or determinations are used to pinpoint the AoA. For example, the TDOA and PDOA measurements may be combined. However, the TDOA ambiguity does not ameliorate the PDOA ambiguities because the TDOA ambiguities may correspond to more than a single PDOA point. Instead, additional devices may be used to pinpoint an angle of arrival by resolving an angle of arrival from at least two transmitting devices to accurately determine an angle of arrival since one solution may satisfy each of the AoA solutions. In other words, additional devices may be used to resolve ambiguities. However, such embodiments require additional communications, power consumption, resource availability, and communication negotiations used for transmitting such information between devices.

Figures 11, 12:
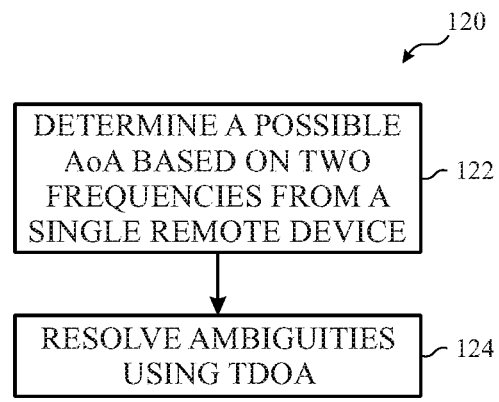
FIG. 11 illustrates a flowchart diagram of a process to estimate AoA for a wireless transmission, according to an embodiment.
FIG. 12 illustrates a graph of a frequency spectrum of wireless communications having wireless bands and wireless channels, according to an embodiment.

FIG. 11 illustrates a process 120 for resolving an angle of arrival (AoA). Specifically, the process 120 includes determining a possible AoA based on two received frequencies (block 122). In other words, the antennas 62, 64 may receive one or more transmissions composed of two or more frequencies. As discussed below, ambiguities may remain, and any remaining ambiguities may be resolved using TDOA (block 124).

For example, the antennas 62, 64 may receive one or more signals via two or more channels of a wireless band. FIG. 12 illustrates a frequency spectrum 130 of frequencies 132 that may be received and used to determine AoA. Specifically, the frequencies 132 may include one or more wireless bands, such as the wireless bands 134, 136, and 138. The wireless bands may include any wireless frequencies that may be used to transmit signals, such as low (L) RF band frequencies; medium (M) band RF frequencies; high (H) RF band frequencies, industrial, science, and medical (ISM) frequencies; unlicensed national information infrastructure (U-NII) frequencies, WiFi bands, and/or other wireless communication bands. Furthermore, the bands may be subdivided into one or more channels. Thus, the band 136 is divided into channels 140, 142, and 144. For example, if the wireless band 136 is a Long-Term Evolution (LTE) 4 GHz Band, the channels 140, 142, and 144 may correspond to channels 1, 2, and 3, respectively. In some embodiments, the frequencies may be restricted to a single band. Two frequencies may be selected when sufficiently spaced within a band. For example, two frequencies may be selected from the furthest spaced channels in a single band to select frequencies as far apart as possible with similar radiation pattern characteristics.

Although the illustrated embodiment of the frequencies 132 includes only three-frequency band, any suitable number of wireless bands may be included. Similarly, some wireless bands may be divided into more than three channels.

FIG. 13A illustrates a graph 150 of two frequencies 152 and 154 plotting their unwrapped phase (degrees) versus degrees. FIG. 13B illustrates the PDOA of the frequencies. PDOA line 160 corresponds to frequency 152, and PDOA line 162 corresponds to frequency 154. When a phase difference on arrival 164 is determined based on a received signal, the PDOA line 160 may be used to determine possible angles of arrival (AoAs) 166 and 168. Other possible angles of arrival may be possible, but AoAs 166 and 168 have been selected for purposes of easing discussion. Using the PDOA line 162, PDOA values 170 and 172 may be determined for each of the corresponding angles of arrival 166 and 168, respectively. A calculated PDOA value may be made for the received frequency 154 and checked verses these values. If one of the PDOA values 170 or 172 matches the calculated PDOA for the received frequency 154, then the angle of arrival may be accurately determined to be the angle of arrival that corresponds to the matching value. However, if the PDOA values 170 and 172 do not match the calculated PDOA for the received frequency 154, determinations may be made at other points on the PDOA 164.

Alternatively, calculations may be made for PDOAs for the received frequencies 152 and 154. These values may be compared to the PDOA lines 160 and 162 to determine where both values exist.

Regardless of order of the calculations, some areas of ambiguity may exist based on the frequencies 152 and 154 selected. For example, at PDOA value 174, both frequencies 152 and 154 correspond to estimated angles at AoA 176 or AoA 178. Thus, in these limited areas, some ambiguities may exist even using two frequencies to determine AoA based on PDOA. Thus, additional calculations may be used to reduce/eliminate these regions of ambiguity. Specifically, TDOA may be used to generally narrow the AoA to a range of values as long as the number of degrees between ambiguities resulting in the dual frequency graph of FIG. 13B exceeds the resolution of the TDOA calculations. For example, in some cases, the TDOA may be accurately used to estimate an AoA to a resolution of 45 degrees. Furthermore, as illustrated, the ambiguities resulting from the dual frequency AoA calculations using frequencies 152 and 154 are more than 45 degrees apart allowing TDOA to eliminate one of the ambiguities to confirm the other value as the correct AoA.

Figure 14:
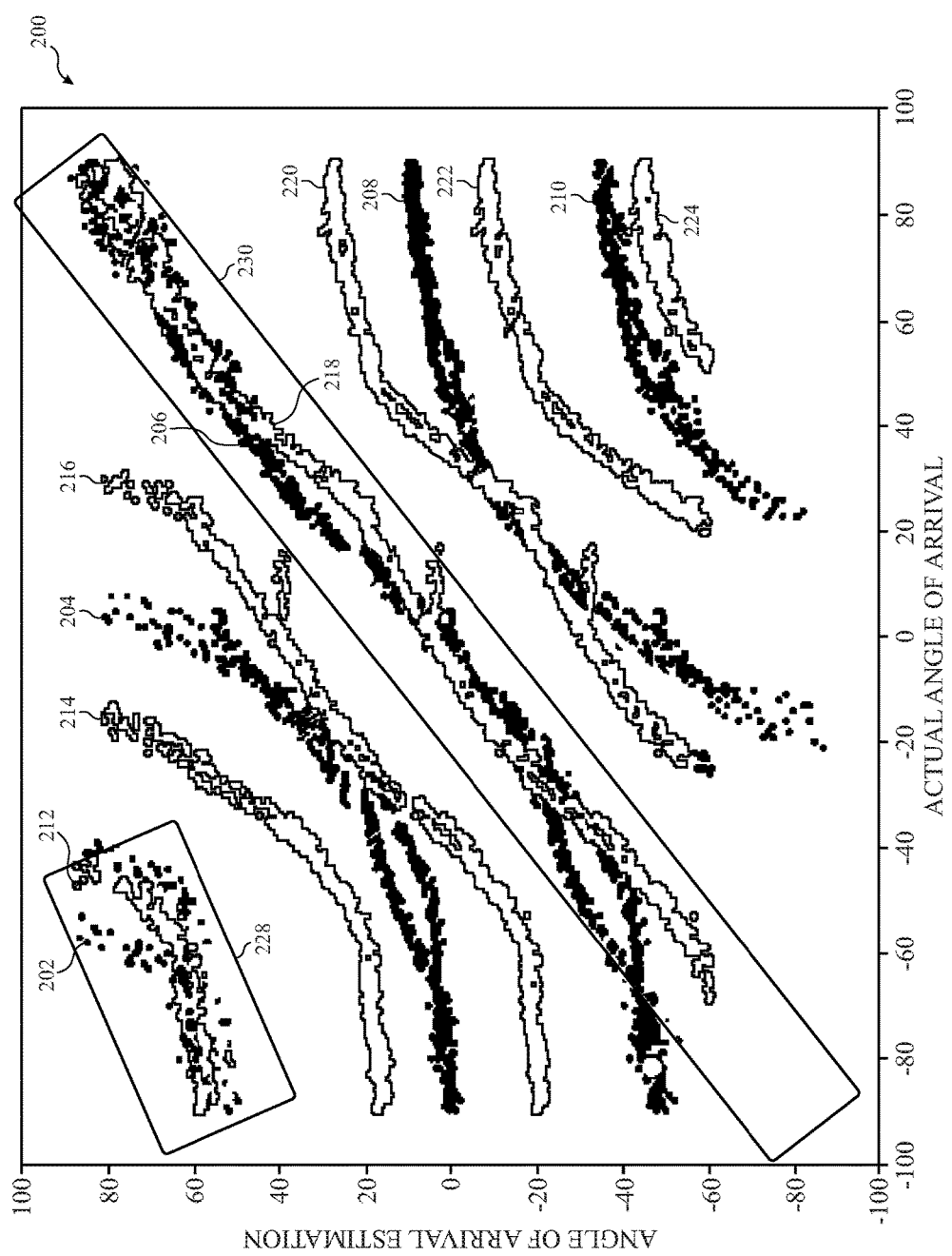
FIG. 14 illustrates a graph of actual AoA versus estimated AoA using PDOA for the frequencies of FIG. 13A having ambiguity regions, according to an embodiment.
Figure 15:
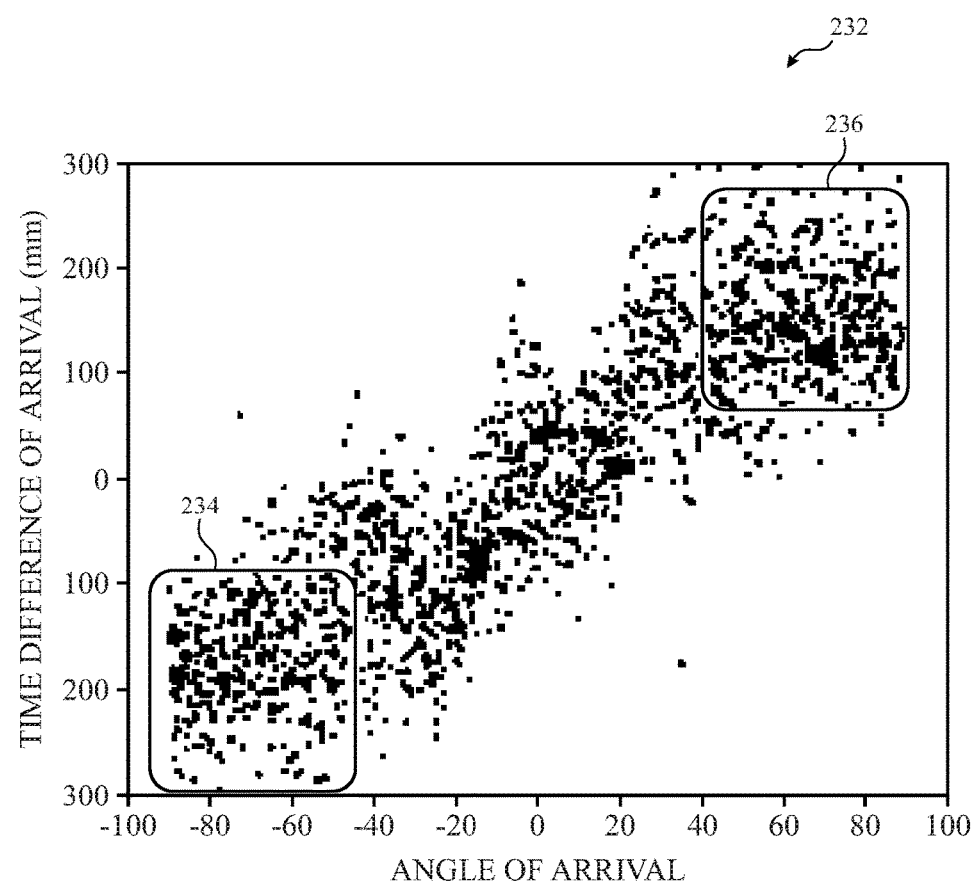
FIG. 15 illustrates a graph of time difference on arrival versus the corresponding angles of arrival and regions corresponding to the ambiguity regions of FIG. 14, according to an embodiment.

FIG. 14 illustrates a graph 200 of actual angles of arrival versus estimated angles of arrival for two frequencies. The graph includes lines 202, 204, 206, 208, and 210 that correspond to a first frequency (e.g., frequency 152) and lines 212, 214, 216, 218, 220, 222, and 224 correspond to a second frequency (e.g., frequency 154). As previously discussed, the lines overlap in some ambiguity regions that cannot be resolved accurately using only the PDOA of the two frequencies. For example, the graph 200 includes ambiguity regions 228 and 230. Specifically, the ambiguity region 228 includes overlapping lines 202 and 212, and the region 230 includes overlapping lines 206 and 218. However, as previously noted, these regions may be distinguished using TDOA. FIG. 15 illustrates a graph 232 of the TDOA in time versus the angle of arrival. The graph 232 includes regions 234 and 236 that correspond to the ambiguity regions 228 and 230 of FIG. 14. If the TDOA is in the region 234, then the angle of arrival may be calculated using the lines 202 and 212 of FIG. 15. Similarly, if the TDOA is in the region 236, then the angle of arrival may be calculated using the lines 206 and 218 of FIG. 14.

Figure 16:
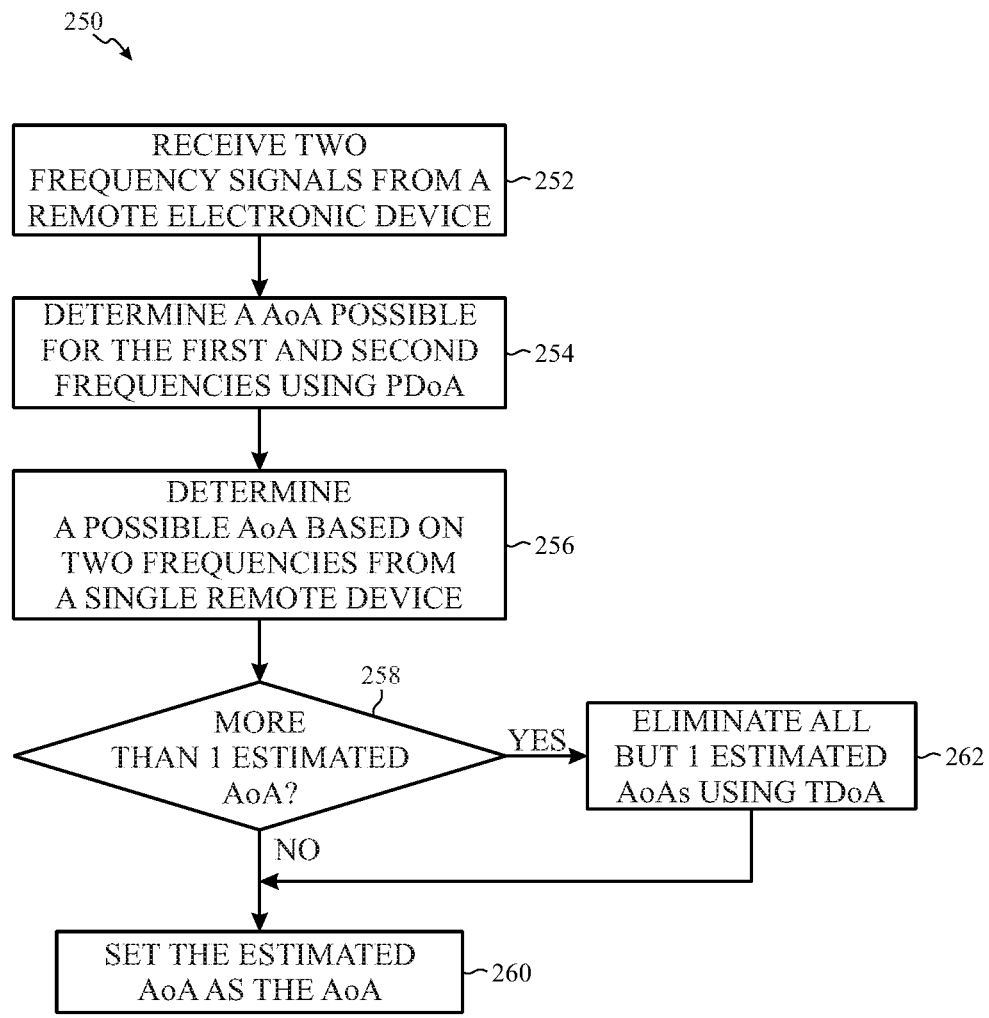
FIG. 16 illustrates a process for estimating AoA using two frequencies, according to an embodiment.

FIG. 16 illustrates a process 250 for determining an AoA when antennas are spaced at a distance other than half lambda for a received frequency. The electronic device 10 and/or 56 receives a wireless signal(s) having two frequency signals from a remote device (block 252). For examples, a single transmission may be received that includes the first and second frequencies, or separate transmissions each having a different frequency may be received from the remote device. Moreover, when the signals are received in separate transmissions, the transmissions may be received from different transmitters and/or antennas of the remote device. The remote device may include any electronic device capable of transmitting wireless signals, such as a cellular basestation, wireless router, cellular device, or other electronic devices suitable for transmitting wireless signals.

The angle of arrival (AoA) logic 72 then calculates AoA possibilities for the first and second frequencies using phase difference on arrival (PDOA) (block 254). The AoA logic 72 then determines an estimated AoA for each possible AoA found in the AoA possibilities for both frequencies (block 256). In other words, when both frequencies indicate a common AoA, this common AoA is determined to be one of the estimated AoAs. After determining all of the estimated AoAs, the AoA logic 72 determines whether more than 1 estimated AoA exists (block 258). If only a single estimated AoA exists, the AoA logic 72 sets the estimated AoA as the AoA for the received transmission(s) (block 260). However, if more than 1 estimated AoA results from the dual frequency estimation, the AoA logic 72 eliminates all but one of the estimated AoAs using time difference on arrival (TDOA) (block 262). As noted above, the TDOA estimation provides enough resolution to differentiate between ambiguities resulting from the dual frequency due to the spacing of the dual frequency ambiguities.

Figure 17:
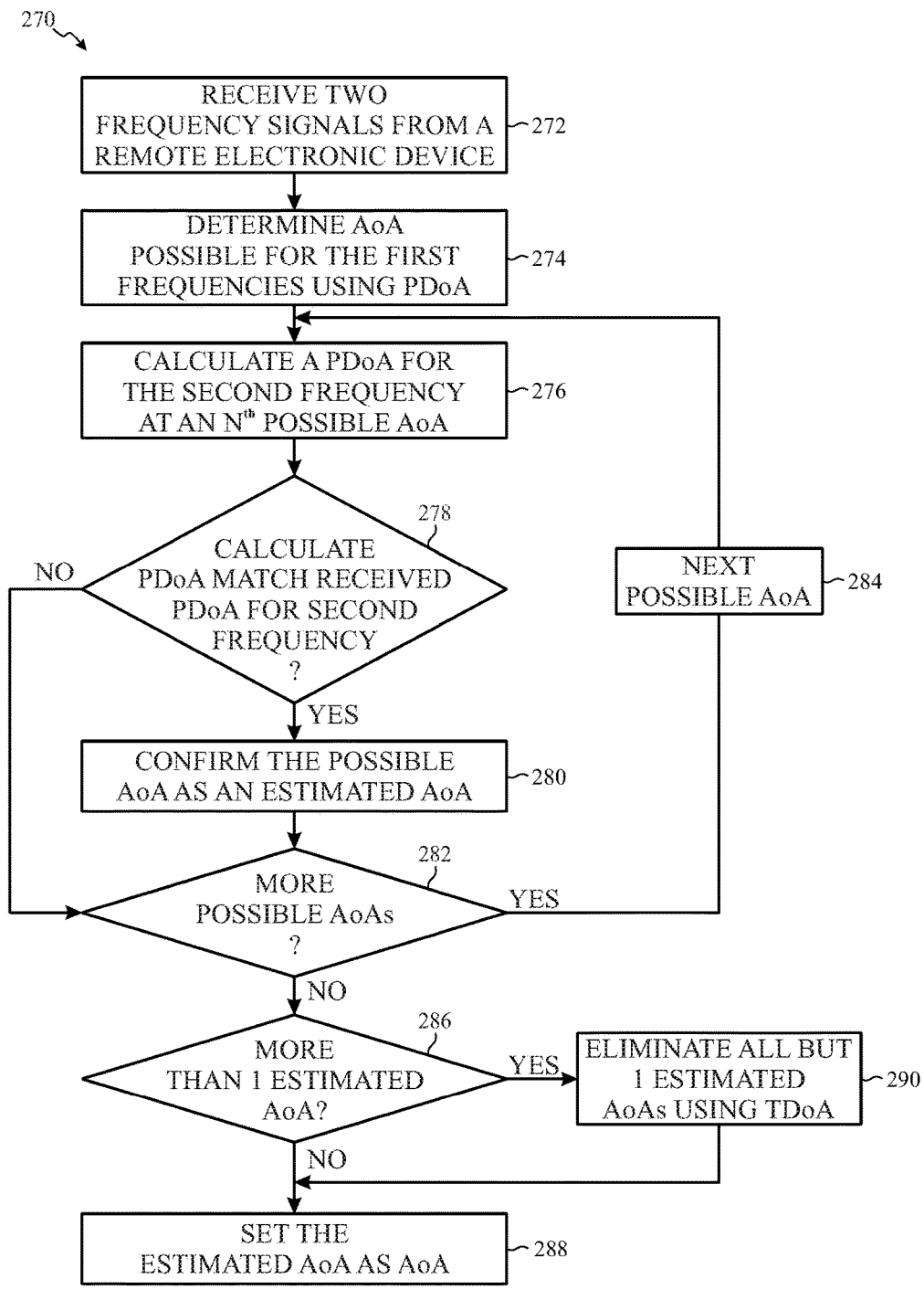
FIG. 17 illustrates another process for estimating AoA using two frequencies, according to an embodiment.

FIG. 17 illustrates a process 270 for determining an AoA when antennas are spaced at a distance other than half lambda for a received frequency. The electronic device 10 or 56 receives a wireless signal(s) having two frequency signals from a remote device (block 272). For examples, a single transmission may be received that includes the first and second frequencies, or separate transmissions each having a different frequency may be received from the remote device. Moreover, when the signals are received in separate transmissions, the transmissions may be received from different transmitters and/or antennas of the remote device. The remote device may include any electronic device capable of transmitting wireless signals, such as a cellular basestation, wireless router, cellular device, or other electronic devices suitable for transmitting wireless signals.

The AoA logic 72 determines one or more AoA possibility of the first frequency signal using PDOA (block 274). The AoA logic 72 calculates a PDOA for the second frequency at an $n^{th}$ possible AoA determined using the first frequency (block 276). The AoA logic 72 may begin with the highest or lowest possible frequency. The AoA logic 72 then determines whether the calculated PDOA using the second frequency matches a PDOA calculated from the received transmission including the second frequency (block 278). If the calculated and received PDOA match, the AoA logic 72 confirms the current possible AoA as an estimated AoA (block 280).

The AoA logic 72 determines whether there are more possible AoAs to evaluate (block 282). If there are more possible AoAs, the AoA logic 72 moves to the next possible AoA (block 284). For example, the AoA logic 72 may move to the next highest/lowest possible AoA and return to block 274 to calculate a PDOA for the second frequency at the new AoA. Once no more possible AoAs remain, the AoA logic 72 determines whether more than one estimated AoA exist from the dual frequency estimation (block 286). In other words, the AoA logic 72 determines whether the dual frequency analysis has occurred in one of the ambiguity regions illustrated in FIG. 13B.

If only a single estimated AoA exists, the AoA logic 72 sets the estimated AoA as the AoA for the received transmission(s) (block 290). However, if more than 1 estimated AoA results from the dual frequency estimation, the AoA logic 72 eliminates all but one of the estimated AoAs using time difference on arrival (TDOA) (block 292). As noted above, the TDOA estimation provides enough resolution to differentiate between ambiguities resulting from the dual frequency due to the spacing of the dual frequency ambiguities.

It may be understood that the foregoing processes may be embodied using hardware, software, or some combination thereof. For example, a processor may be used to perform instructions stored in memory that are configured to cause the processor to perform the portions of the processes 250 and 270, when executed. In other words, the received signals may be at least partially digitally filtered.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
    one or more receivers;
    two or more antennas coupled to the one or more receivers configured to receive a wireless transmission, wherein the wireless transmission comprises a first frequency signal at a first frequency and a second frequency signal at a second frequency, wherein the first frequency and the second frequency are different frequencies, wherein the first frequency is in a first channel of a common wireless band of a common wireless protocol that includes the first frequency and the second frequency, and the second frequency is in a second channel of the common wireless band of the common wireless protocol; and
    angle of arrival circuitry coupled to the one or more receivers and configured to determine one or more angles of arrival of the wireless transmission to the electronic device using phase difference on arrival based on each of the first and second frequency signals.

2. The electronic device of claim 1, wherein the angle of arrival circuitry is configured to:
   determine whether one or more possible angles of arrival have been determined based on the first and second frequency signals; and
   when there is more than one angle of arrival, reduce a number of possible angles of arrival by resolving an ambiguity by eliminating at least one of the one or more possible angles of arrival that is most different from an estimated angle of arrival based on time difference on arrival calculated for the first frequency signal or the second frequency signal, or both.

3. The electronic device of claim 1, wherein at least one channel is located between the first and second channel in the common wireless band.

4. The electronic device of claim 1, wherein the first channel and the second channel are the farthest spaced channels in the common wireless band.

5. An electronic device comprising:
   one or more receivers;
   two or more antennas coupled to the one or more receivers, wherein each of the antennas is configured to:
      receive a first frequency signal from a remote electronic device, wherein the first frequency signal has a first frequency; and
      receive a second frequency signal from the remote electronic device, wherein the second frequency signal has a second frequency, wherein the first and second frequencies are received in separate transmissions from a remote electronic device; and
   angle of arrival circuitry coupled to one or more receivers and configured to determine one or more possible angles of arrival of the first frequency signal or the second frequency signal, or both, to the electronic device based on the first and second frequency using difference on arrival between the two or more antennas.

6. The electronic device of claim 5, wherein the difference on arrival comprises phase difference of arrival.

7. The electronic device of claim 5, wherein the angle of arrival circuitry is configured to:
   determine whether one or more possible angles of arrival have been determined based on the first and second frequency signals; and
   if there is more than one possible angle of arrival, reduce a number of possible angles of arrival by resolving an ambiguity by eliminating at least one of the one or more possible angles of arrival that is most different from an estimated angle of arrival based on using time difference on arrival calculated for the first frequency signal or the second frequency signal, or both.

8. The electronic device of claim 7, wherein reducing the number of possible angles of arrival comprises eliminating all but one possible angle of arrival.

9. The electronic device of claim 5, wherein the first frequency signal and the second frequency signal are contained in a single transmission.

10. A method comprising:
    receiving, at two or more antennas, two frequency signals from a remote electronic device, wherein receiving the two frequency signals comprises receiving the two frequency signals in separate transmissions from the remote electronic device;
    determining one or more possible angles of arrival of the two frequency signals using phase difference on arrival based on the two frequency signals; and
    determining one or more estimated angles of arrival of the two frequency signals using an angle of arrival estimation process other than phase difference on arrival that each corresponds to a possible angle of arrival that results from phase difference on arrival from both frequencies, wherein determining one or more estimated angles of arrival comprises reducing a first number of estimated angels arrivals resulting from the angle of arrival estimation process other than phase difference on arrival.

11. The method of claim 10 comprising:
    determining whether more than one estimated angle of arrival has been determined; and
    when there is more than one angle of arrival that has been determined, eliminating all but one estimated angle of arrival by resolving an ambiguity by eliminating at least one of the one or more estimated angles of arrival that is most different from an estimated angle of arrival based on using time difference on arrival calculated for at least one of the two received frequencies.

12. The method of claim 10, wherein each of the separate transmissions derives from a separate antenna of the remote device.

13. The method of claim 10, comprising identifying an angle of arrival for each transmission to a remaining estimated angle of arrival.

14. A method comprising:
    receiving, at two or more antennas, a first frequency signal from a remote electronic device, wherein the first frequency signal comprises a first frequency;
    receiving, at the two or more antennas, a second frequency signal from the remote electronic device, wherein the second frequency signal comprises a second frequency, wherein the first and the second frequencies are different frequencies, wherein the first frequency and the second frequency are different frequencies, wherein the first frequency is in a first channel of a common wireless band of a common wireless protocol that includes the first frequency and the second frequency, and the second frequency is in a second channel of the common wireless band of the common wireless protocol;
    determining one or more possible angles of arrival of the first frequency signal using phase difference on arrival for the first frequency signal;
    calculating a phase difference on arrival for the second frequency signal at a possible angle of the one or more possible angles of arrival of the first frequency signal;
    determining whether the calculated phase difference on arrival for the second frequency signal at the possible angle matches a phase difference on arrival calculated for the received second frequency signal; and
    when the possible angle matches the phase difference on arrival calculated for the received second frequency signal, confirming the possible angle as an estimated angle of arrival.

15. The method of claim 14, comprising:
    determining whether one or more possible angles of arrival have been determined based on the first and second frequency signals; and
    if there is more than one possible angle of arrival, reducing a number of possible angles of arrival to one by resolving an ambiguity by eliminating at least one of the one or more possible angles of arrival that is different from an estimated angle of arrival based on using time difference on arrival calculated for the first frequency signal or the second frequency signal.

16. The method of claim 14, wherein the first and second frequency signals are contained in a single transmission.

17. The method of claim 16, comprising identifying a sole estimated angle of arrival as the angle of arrival for the transmission.

\* \* \* \* \*